Aug. 12, 1930.    N. EDWARDS    1,772,800
SEPARATION OF LAMINATED GLASS
Filed Jan. 30, 1929
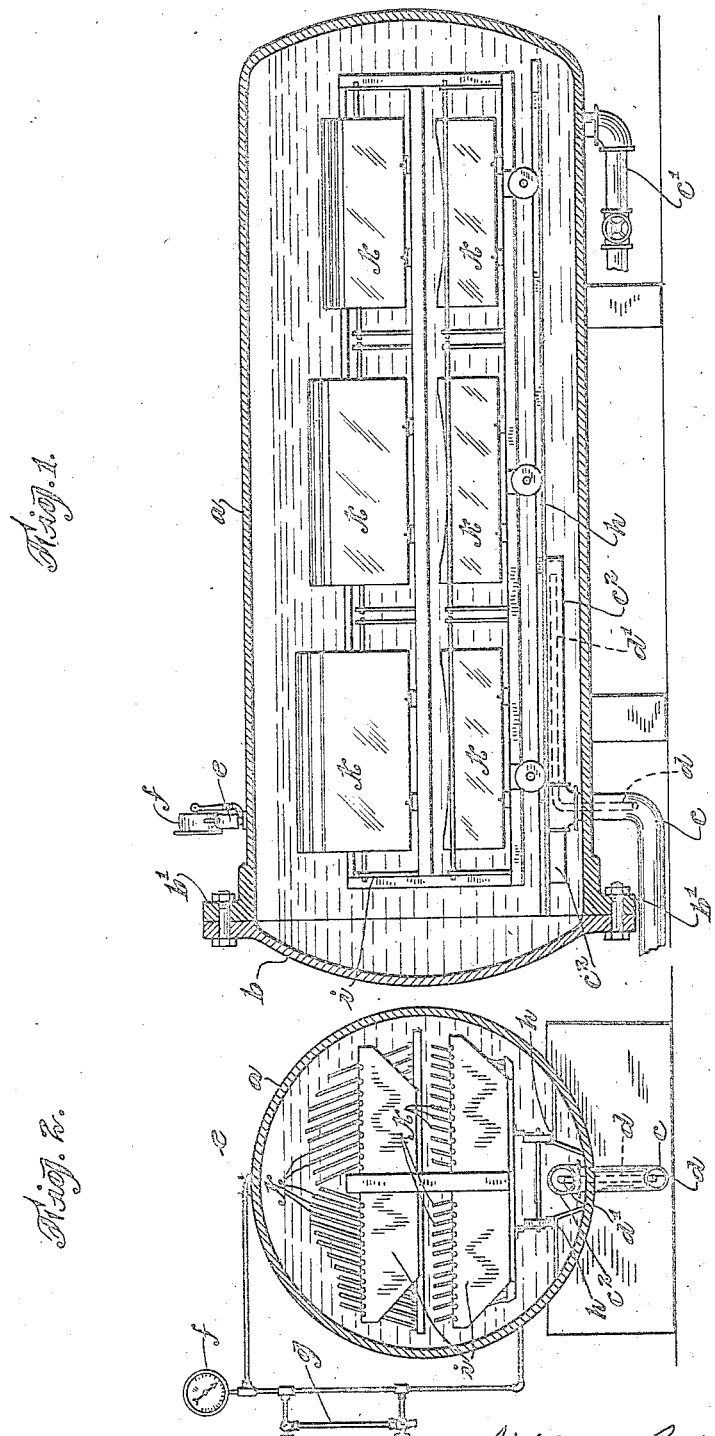
INVENTOR
Nilson Edwards
BY
Redding, Greeley, O'Shea & Campbell
ATTORNEYS Patented Aug. 12, 1930

1,772,800

UNITED STATES PATENT OFFICE

NEILSON EDWARDS, OF RED BANK, NEW JERSEY, ASSIGNOR TO TRIPLEX SAFETY GLASS COMPANY OF NORTH AMERICA, OF CLIFTON, NEW JERSEY, A CORPORATION OF DELAWARE

SEPARATION OF LAMINATED GLASS

Application filed January 30, 1929. Serial No. 336,133.

Laminated glass, composed of a sheet of celluloid between two sheets of glass to which the celluloid is strongly adherent, must be free from imperfections such as are caused by bubbles of air or dust or anything other than celluloid and equally transparent cement between the two sheets of glass. Methods of manufacture of laminated glass have not reached such a degree of perfection that imperfections of this character can always be prevented. That which causes such an imperfection is sometimes not apparent or is overlooked during the process of manufacture and is discovered only when the laminated glass is inspected after manufacture. The result is that there is produced some laminated glass which is not marketable and in which the glass represents a material item of cost. If the adhesion of the celluloid and the glass is permanent, as is to be desired, it is practically impossible to separate the two sheets of glass without breaking. It is the object of this invention to provide a method by which the separation of the laminated glass can be effected economically and with a minimum of breakage. In accordance with the invention the glass to be separated is placed in a bath of cold water, that is, of water at normal or room temperature, and both temperature and pressure are gradually increased until the temperature is raised to about 250° F. so as to produce a decomposition and thereby produce a bubbly or porous structure in the celluloid. The bath having been maintained for a time sufficient to bring about such structure and permit the hot water to circulate through the bubbly or porous structure and effect the separation of the glass from the celluloid, the pressure and the temperature are gradually reduced to normal atmospheric pressure and normal room temperature. The glass is then removed from the bath and the two sheets can then be separated readily. The gradual raising of the temperature and pressure and the gradual lowering of the same while circulation of the water is maintained are necessary to prevent the setting up of molecular stresses in the glass which would or might produce fracture. The invention will be more fully explained hereinafter with reference to the accompanying drawing in which is illustrated an apparatus adapted for the practice of the method and in which:

Figure 1 is a view in longitudinal sectional elevation of such an apparatus.

Figure 2 is a view of the same in transverse sectional elevation.

The apparatus comprises a tank $a$ capable of withstanding an internal pressure of about 450 pounds and provided with a removable door $b$ which may be bolted to a flange as indicated at $b'$. The tank is provided with a water inlet $c$, a water outlet $c'$, a steam inlet $d$, a safety valve $e$, a pressure gage $f$ and a water gage $g$, all with suitable connections. The water inlet $c$, connected to any suitable source, terminates within the tank $a$ in a section $c^2$ open at both ends. The steam pipe $d$ preferably enters the tank through the water inlet and terminates, as at $d'$, in a pipe within the open ended section $c^2$. The tank is also provided with a track $h$ adapted to receive a wheeled car or rack $i$ suitably constructed to receive the sheets of glass, indicated at $k$, which are to be separated. In the practice of the method the rack $i$, loaded with the glass to be separated, is run into the open and empty tank $a$. The door $b$ is then fastened in place, precautions being taken to secure the door so tightly that there shall be no leakage when the required pressure is developed within the tank. When the glass is in place the tank is filled, through the inlet pipe $c$, with water at normal room temperature until all of the glass on the rack is submerged. Steam is then admitted through the pipe $d$, usually at about 40 pounds pressure. As the steam issues from the pipe $d'$ within the open ended section $c^2$ of the water pipe, it causes the water in the tank to circulate, the outlet pipe $c'$ having been closed. At the same time the steam raises the temperature of the water gradually until a bubbly or porous structure of the celluloid is produced, the pressure being also raised. The circulation of the hot water through the structure of the celluloid is continued for such time as may be necessary to effect the loosening of the sheets of glass from the celluloid. It will be found usually that at the end of about one-hundred minutes or more the separation of the glass will have been accomplished generally with more or less disintegration of the celluloid. When the glass has been subjected for the required time to the action of the hot water the tank and its contents are allowed to cool or are cooled gradually by the addition of cold water, the entire charge being eventually drawn off through the outlet $c'$. The door of the tank is then removed, the rack with its load of glass is withdrawn and each sheet of the laminated glass is handled separately to complete the separation of the two sheets. It may be necessary sometimes to start the separation of the two sheets of glass by the introduction of a knife blade between them, but ordinarily it will be found that the two sheets separate without this.

I claim as my invention:

1. The method of separating laminated glass which consists in placing a sheet of laminated glass comprising sheets of glass and an interposed sheet of celluloid in a bath of cold water, gradually raising the temperature to produce a bubbly or porous structure in the celluloid, maintaining the temperature of the bath to permit the heated water to circulate in the bubbly or porous structure of the celluloid, gradually lowering the temperature of the bath, and finally removing the glass from the bath.

2. The method of separating laminated glass which consists in placing a sheet of laminated glass comprising sheets of glass and an interposed sheet of celluloid in a bath of cold water, introducing steam into the bath until the temperature of the bath has been raised to produce a bubbly or porous structure in the celluloid, maintaining the temperature of the bath to permit the heated water to circulate in the bubbly or porous structure of the celluloid, gradually lowering the temperature of the bath, causing the water to circulate during the raising, maintaining and lowering of the temperature and finally removing the glass from the bath.

3. The method of separating laminated glass which consists in placing a sheet of laminated glass comprising sheets of glass and an interposed sheet of celluloid in a bath of cold water within a closed vessel, introducing steam into the water in the vessel until the temperature is raised to produce a bubbly or porous structure in the celluloid and the pressure is also raised, maintaining the temperature of the bath to permit the heated water to circulate in the bubbly or porous structure of the celluloid, gradually lowering the temperature and pressure of the bath, causing the water to circulate in the vessel during the raising, maintaining and lowering of the temperature, discharging the water from the vessel, and removing the glass.

This specification signed this 25 day of January A. D. 1929.

NEILSON EDWARDS.